(No Model.)
C. W. WENTWORTH & S. M. MANCHESTER.
CREAMING CAN.
No. 422,476. Patented Mar. 4, 1890.
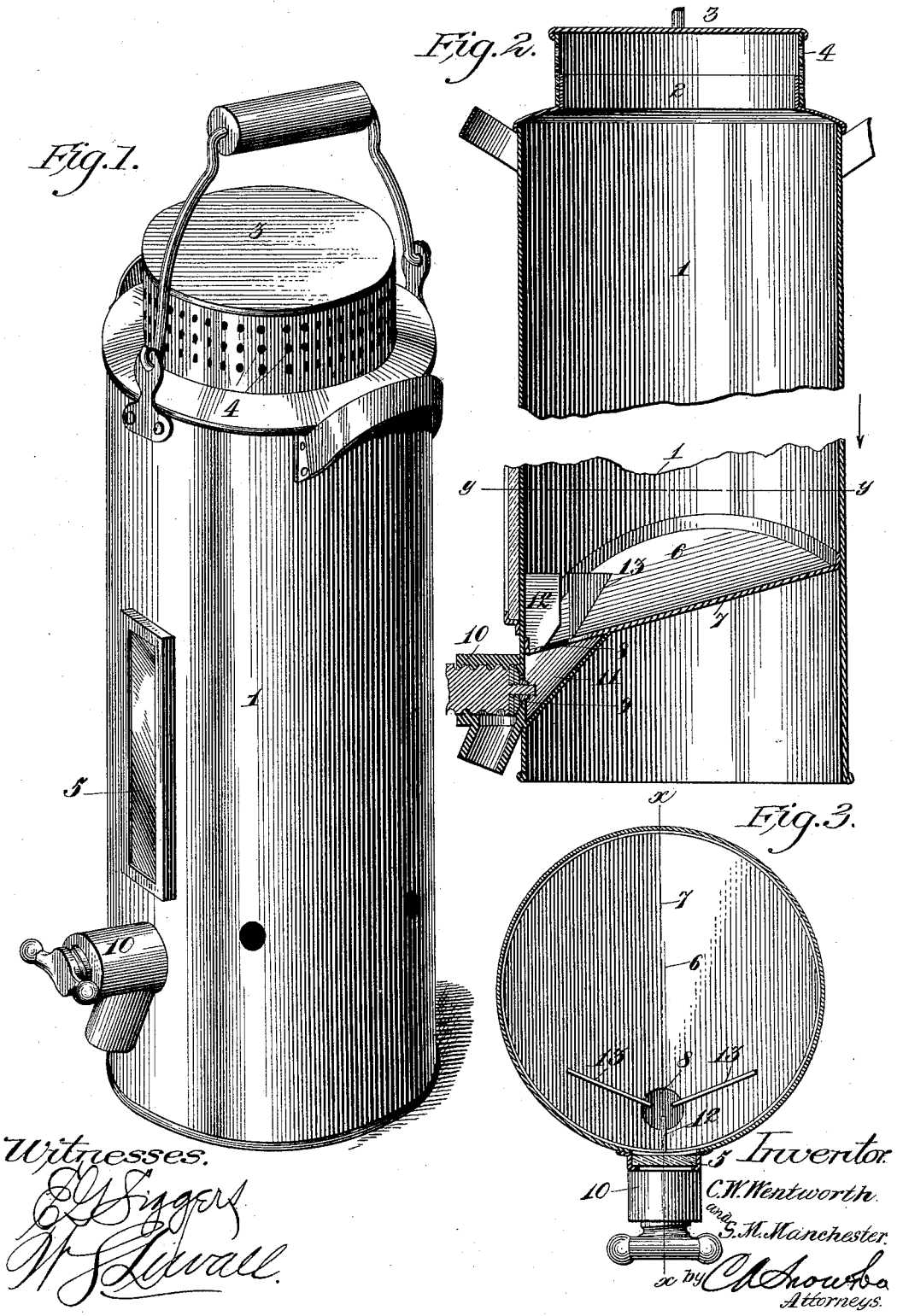

UNITED STATES PATENT OFFICE.

CHARLES W. WENTWORTH AND SEWARD M. MANCHESTER, OF WINDHAM, MAINE.

CREAMING-CAN.

SPECIFICATION forming part of Letters Patent No. 422,476, dated March 4, 1890.

Application filed January 17, 1888. Serial No. 261,063. (No model.)

*To all whom it may concern:*

Be it known that we, CHARLES W. WENTWORTH and SEWARD M. MANCHESTER, citizens of the United States, residing at Windham, in the county of Cumberland and State of Maine, have invented a new and useful Improvement in Vessels for Settling and Cooling Milk, of which the following is a specification.

Our invention has relation to milk-coolers of that class involving the principle of that method of cream-raising known as "deep-setting" or Swedish method, by which is meant a reduction of the temperature of the contents of the cream-can by immersing the same in a body of water for that purpose.

Among the objects of the invention are to so construct the cooler or can as to be readily drained of all sediment without waste of milk, and which, after such drainage, will permit of the withdrawal of the milk from under the cream, leaving the latter within the can for a subsequent withdrawal.

A further object of the invention is to destroy or prevent all currents of the milk, and therefore intermingling of the cream and milk, as is usually caused by the drainage of the milk from under the cream, and by our invention to maintain the body of cream in an unbroken pure state upon the surface of the milk.

With these general objects in view the invention consists in a V-shaped bottom inclined toward one side of the wall of the can and communicating with the drainage-port and in a series of angularly-disposed blades arranged upon the bottom, the novel features of construction of which will be hereinafter described, and particularly pointed out in the claims.

Referring to the drawings, Figure 1 is a perspective of a cooler constructed in accordance with our invention. Fig. 2 is a central vertical section on the line *x x* of Fig. 3; Fig. 3, a transverse section on the line *y y* of Fig. 2.

Like numerals of reference indicate like parts in all the figures of the drawings.

1 represents a preferably cylindrical can terminating at its upper end in an open mouth formed by a collar 2.

3 represents the cover, the annular flange of which receives the collar and is provided with an annular series of perforations 4, communicating with the interior of the cooler and adapted to discharge the animal heat from the milk when set for creaming.

5 represents a sight-panel arranged in the body of the cooler and of the usual construction and permitting an examination of the state of the contents of the cooler.

6 represents the bottom of the cooler, and the same is of V shape, the opposite halves of the bottom being inclined inwardly to form a central clearance-channel 7. The bottom is also inclined longitudinally of the channel and is provided with a drainage-port 8 in line with the channel 7 and at the lower end thereof. We also prefer to arrange the bottom considerably above the lower end of the cooler, as shown in Fig. 2.

9 represents a discharge-port, secured to which is a faucet 10, and communicating with the faucet through the port 9 and with the discharge-port 8 is an intermediate discharge-passage 11.

12 represents a radial partition or blade, which extends from the interior wall of the cooler and projects slightly over the port 8.

13 represents two opposite triangular blades or partitions arranged a short distance up the channel 7 at an oblique angle to each other and to the partition 12 and secured to the opposite inclined halves of the bottom 6 in planes at right angles thereto. These blades have their adjacent edges slightly separated just above the channel 7 and their inner corners projected slightly over the edge of the port 8.

From the above construction it will be apparent that all sediment in the milk will settle at the lower end of the inclined drainage-channel 7 and may be readily discharged by opening the faucet 10. It will be also apparent that after such drainage the milk may be drawn off from under the cream and that the undesirable rotary circulation or current of milk that usually takes place in coolers of this character is prevented by the partitions or blades 12 and 13.

It will be obvious that when the faucet 10 is opened but slightly a gentle current will be caused to flow down the channel 7 and between the adjacent edges of the plates 13, thus drawing off the sediment; but when the faucet 10 is opened to a considerable degree to draw off the milk the latter will be caused to flow downwardly between and alongside the three blades, because the opening between any two of the blades is smaller than the port 8 and sufficient liquid cannot pass laterally between them to feed the volume being drawn off.

Having thus described our invention, what we claim is—

1. In a milk-cooler, the bottom 6, the opposite halves of which are inclined inwardly to form a central channel 7, the whole inclined longitudinally of said channel and provided with a port 8 in the bottom of the channel near its lower end, in combination with the independent vertical plates 12 13 13, projecting slightly beyond the edges of said port and out of contact at their inner edges.

2. In a milk-cooler, the bottom 6, the opposite halves of which are inclined inwardly to form a central channel 7, the whole inclined longitudinally of said channel and provided with a port 8 in the bottom of the channel near its lower end, in combination with the independent vertical plates 12 13 13, projecting slightly beyond the edges of the said port and out of contact at their inner edges, the lowermost plate 12 standing in line with said channel and the others nearly at right angles thereto, as and for the purpose set forth.

Dated January 9, 1888.

CHARLES W. WENTWORTH.
SEWARD M. MANCHESTER.

Witnesses:
NETTIE J. WENTWORTH,
H. W. BOWEN.